United States Patent [19]

Von Arnauld et al.

[11] 3,964,349

[45] June 22, 1976

[54] METHOD AND APPARATUS FOR GRINDING THE TEETH OF A CIRCULAR SAW TO AN IMPROVED CONTOUR

[75] Inventors: Horst Von Arnauld; Daniel Joseph Murphy, both of Oakland, N.J.

[73] Assignee: Von Arnauld Corporation, Franklin Lakes, N.J.

[22] Filed: Jan. 13, 1975

[21] Appl. No.: 540,449

[52] U.S. Cl. ............................ 76/41; 51/73 R; 76/112
[51] Int. Cl.² ...................... B23D 63/14; B24B 3/40
[58] Field of Search ............... 76/37, 40, 41, 42, 43, 76/112; 51/34 D, 73 R, 92 BS, 92 ND

[56] References Cited
UNITED STATES PATENTS

| | | | |
|---|---|---|---|
| 1,771,602 | 7/1930 | Armstrong | 76/41 |
| 2,874,517 | 2/1959 | Markle | 51/34 D |
| 2,958,240 | 11/1960 | Segal | 76/112 |
| 3,304,810 | 2/1967 | English | 76/40 |
| 3,313,185 | 4/1967 | Drake et al. | 76/43 |
| 3,616,711 | 11/1971 | Daggett | 76/37 |
| 3,766,806 | 10/1973 | Benner | 76/37 X |

*Primary Examiner*—Al Lawrence Smith
*Assistant Examiner*—Nicholas P. Godici
*Attorney, Agent, or Firm*—Behr and Woodbridge

[57] ABSTRACT

A cup-shaped grinding wheel having an abrasive inner rim is brought into grinding contact with a tooth of a circular saw. The angle of attack of the grinding wheel is such that it imparts a second surface to the face of the saw tooth. The second generated surface has a continuous curved contour and a more negative average rake angle than the remaining portion of the face of said tooth. The apparatus and method are especially adapted to grinding the carbide tipped teeth of steel cutting saws but this technique may be used on other saw blades. Movements of the machine elements are automatically governed by a programmed electronic unit which, in turn, controls a system of hydraulic pistons.

20 Claims, 14 Drawing Figures

METHOD AND APPARATUS FOR GRINDING THE TEETH OF A CIRCULAR SAW TO AN IMPROVED CONTOUR

BACKGROUND OF THE INVENTION

1. Field of the Invention

This invention relates, in general, to the saw grinding art and, in particular, to a method and apparatus for grinding the teeth of a circular saw to an improved contour.

2. Description of the Prior Art

The practice of grinding circular saws with abrasive wheels is known to those of ordinary skill in the art. Grinding equipment is made, for example, by the Vollmer Corporation of Dornhan, West Germany, and others. One of the major problems associated with conventional prior art carbide tipped steel cutting circular saws is that they cut slowly and wear out quickly. However, this difficulty was greatly reduced by the discovery that if the top of the face of the saw teeth are specially shaped to have a more negative rake angle relative to the rake of the rest of the tooth face, then efficiency was greatly approved. The special shaping typically involved multiple grinding operations in which several flat facets were formed in the top of the carbide tip. While the new shape was superior to the old shape, it was nevertheless time consuming to grind due to its multi-faceted contour. A description of this prior art shape may be found in an article by Pahlitzsch and Willemeit which appeared in Volume 58, Issue 4 of Werkstattstechneik (1968).

It is presently believed that a curved surface may be used to approximate the new German geometry. However, a method and apparatus for automatically forming such an improved contour is not believed to be available at the time of this invention. Therefore, the present invention arose to fulfill the need for such equipment. A principal advantage of generating a more negative rake surface in this manner is that it saves several grinding steps over the previous method necessary to form the German geometry. By avoiding extra grinding steps, it is possible to realize higher machine efficiencies and lower operating costs.

SUMMARY OF THE INVENTION

According to the present invention, a cup-shaped grinding wheel is used to impart a continuous curved contour to the teeth of a circular saw. The wheel includes an inner grinding rim in which abrasive diamond dust is held in a plastic matrix. The circular saw to be ground is typically a carbide-tipped circular saw of the sort used to cut steel bar stock and the like. However, other circular saws may be cut by this method. A spring loaded clamp holds the saw steady during the grinding operation and an indexing finger is used to advance a new tooth into the grinding position between grinding steps.

The grinding wheel is affixed to a rotatable shaft whose advance into the saw blade and withdrawal from the saw blade is controlled by an hydraulic piston. A secondary set of pistons and valves is employed to control the speed of advance and withdrawal, thereby controlling the general machine cycling time. A delay means comprising another hydraulic cylinder receives the overflow from the fully extended grinding wheel hydraulic cylinder and acts as a dwell time delay device which signals the end of the grinding cycle and the return of the machine elements to a "start" position. The sequence of machine operations is controlled by a programmed electronic unit which in turn governs an hydraulic system of pistons and valves.

The grinding operation is adapted to remove a portion of the face of the carbide tip of the saw and to impart an improved contour thereto. The preferred grinding rim generates a conical section during grinding and therefore the ground tooth takes on a parially conical shape. This shape roughly approximates the recently developed multi-faceted German geometry which has proven so successful. The ground portion of the face of the tooth is generally left with a negative rake angle of between 0° and 30° whereas the remaining portion of the face of the tooth typically has a more positive rake angle. Other rims may be used to generate non-conical surfaces and it is also possible to produce compound and complex curves by manipulating the position of the saw and/or grinding wheel during the grinding process. The principal advantage of this apparatus and method is that it produces an acceptably ground saw having improved cutting characteristics without the necessity of additional grinding steps as required by the manufacture of saws having the multi-faceted German geometry.

These and other advantages will be more fully understood with reference to the following drawings.

DETAILED DESCRIPTION OF THE INVENTION

During the course of this description, like numbers will be used to indicate like elements according to the different figures.

Figure 1A:
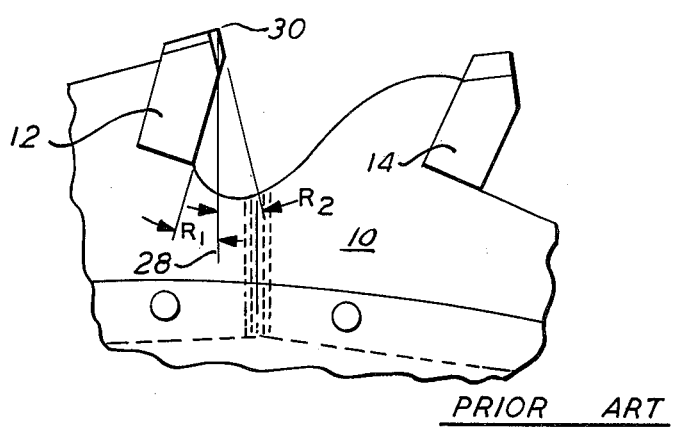
FIGS. 1A-1D illustrate prior art multi-faceted saw teeth incorporating the German geometry.
Figure 1B:
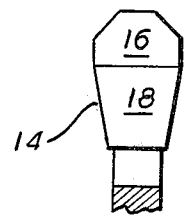
Figure 1C:
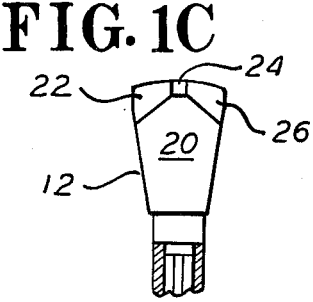
Figure 1D:
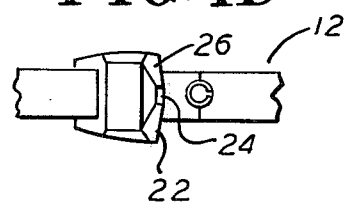

FIG. 1A is a side elevation of a section of a prior art circular saw incorporating the recently developed German geometry. As previously discussed, a description of this geometry can be found in Volumn 58, Issue 4 of Werkstattstechneik (1968). According to FIG. 1A, a prior art circular saw 10 is shown to include a section having two separate types of teeth of different geometry 12 and 14. By alternating teeth such as 12 and 14 around the periphery of saw 10 it is possible to alternatively gouge and then cut through hard metal, such as steel. The technique of using alternating teeth of different geometry is well known to those of ordinary skill in the art. The face of tooth 14 is shown in FIG. 1B to include a top half 16 and a bottom half 18. Likewise, the face of tooth 12 is shown in FIGS. 1C and 1D to include a bottom half 20 and a top half including facets 22, 24 and 26.

The rake angle of a saw tooth is typically defined as the angle between the face of the tooth and a line passing through the diametrical center of the circular saw. When a line 28 is drawn between the tip 30 of tooth 12 and the center of the saw 10 (center is not shown) it subtends an angle R1 with respect to the profile of tooth surface 20 and an an angle R2 with respect to the profile of facet surface 24. It will be noted that the plane of face 20 lies on an opposite side of line 28 than the plane of face 24. Angle R1 is therefore a more positive rake angle and angle R2 is conversely a more negative rake angle. In a similar fashion, the rake angle of surface 16 of tooth 14 is moren negative whereas the rake angle of surface 18 is more positive.

Surface 16 of tooth 14 is relatively easy to generate since it only entails a single additional grinding step. On the other hand, facets 22, 24 and 26 of tooth 12 are more difficult to generate since they require at least three additional grinding steps. if a plant is running at full capacity grinding or regrinding circular saws, then it is evident that the additional grinding steps necessary to generate the facets 22, 24 and 26 can be a costly and time consuming operation.

In order to increase machine efficiencies and to reduce costs, it would be desirable to produce saw teeth similar to tooth 12 but incorporating fewer machines steps or cycles. It is now believed that it is possible to approximate the geometry of facets 22, 24 and 26 with a continuous curved contour. At present, no machinery is known to exist which will automatically perform this function. It was in the context of this situation that the present invention arose.

Figure 2A:
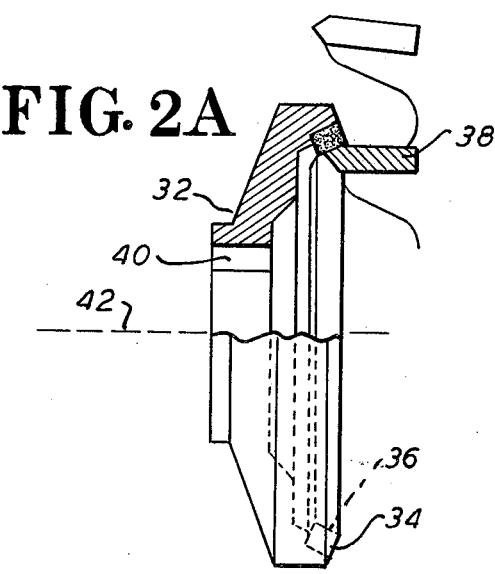
FIGS. 2A and 2B illustrate a cross-sectional view and a front view, respectively, of the cup-shaped grinding wheel of the present invention.
Figure 2B:
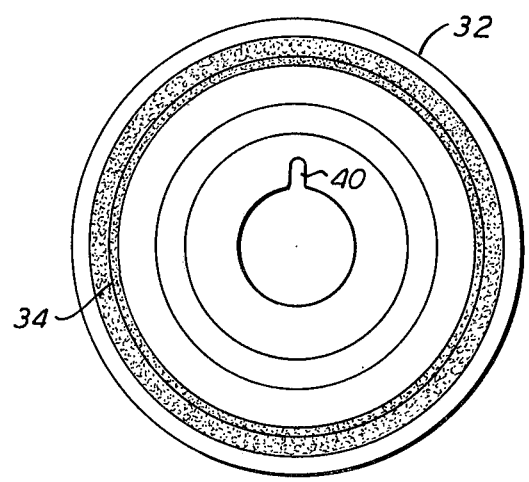

A device used to achieve the desired continuous curved contour is illustrated in FIGS. 2A and 2B. The device consists, essentially, of a cup-shaped grinding wheel 32 which is illustrated in a cross-sectional elevated view in FIG. 2A and in a front view in FIG. 2B. The body of grinding wheel 32 is preferably Bakelite, but aluminum or other metals known to those of ordinary skill in the art may also be used. Grinding wheel 32 includes an abrasive inner rim 34. Rim 34 typically incorporates a diamond dust material held in a plastic-like medium. Rim 34 includes an inner conical working surface 36 which comes into actual contact with a carbide saw tip 38. Grinding wheel 32 is adapted to fit on a rotatable shaft 58 which is received through the center of the wheel 32 and secured therein by a screw. The central axis 42 of the grinding wheel 32 therefore coincides with the axis of the rotatable shaft 58 upon which the wheel 32 is received. As illustrated in FIG. 2, the plane of surface 36 subtends an angle of about 20° with respect to grinding wheel axis 42. In practice, this angle may typically be anywhere between 0° and 30°.

The grinding of the tooth with a wheel such as 32 is predicated on the proposition that the wheel approaches the saw teeth at an angle nearly perpendicular to the tangent of the outside circumference of the saw 10. However, if the wheel were to approach at an angle other than perpendicular, obviously surface 36 would have to be realigned with respect to axis 40 so that a suitable tooth contour is generated. It is generally not desirable to approach saw 10 at an angle other than perpendicular because of the possible interference of the non-grinding section of rim 34 with other teeth on the saw during grinding cycle.

Figure 3A:
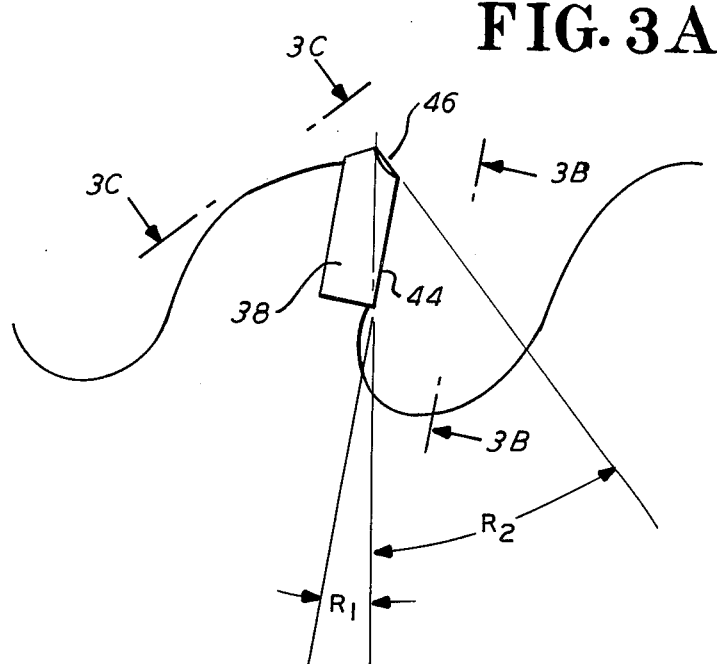
FIGS. 3A – 3C illustrate views of a tooth formed by the method and apparatus of the present invention.
Figure 3B:
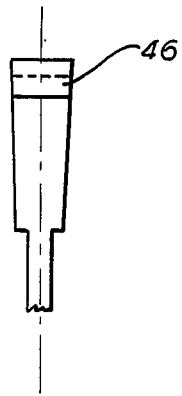
Figure 3C:
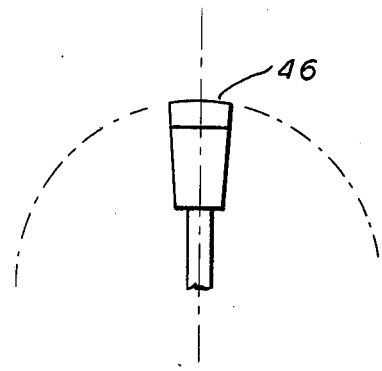

A tooth of the type generated by grinding wheel 32 is illustrated in FIG. 3A-3B. The carbide tip 38 has a conventional front face 44 and a curved continuous contour 45 caused by the grinding of rim 34. As with the prior art teeth illustrated in FIGS. 1A – 1D, surface 44 subtends a more positive rake angle R1 with respect to perpendicular 48 whereas generated surface 46 subtends a more negative rake angle R2 with respect to perpendicular 48. While the rake angle R1 has been shown to be positive according to the preferred embodiments, it will be appreciated by those of ordinary skill in the art that R1 may indeed be negative in certain circumstances. The more important relationship is that R2 is a more negative angle than R1. Additionally, the surface 46 generated by a wheel such as 32 will tend to be conical in shape, providing that the surface 36 of rim 34 is relatively flat. However, other surfaces can be obtained by changing the shape of abrasive surface 36 or by moving grinding wheel 32 relative to saw 10 and vice-versa during the grinding procedure. In this fashion, parabolic and other compound or complex surfaces may be generated.

Figure 4:
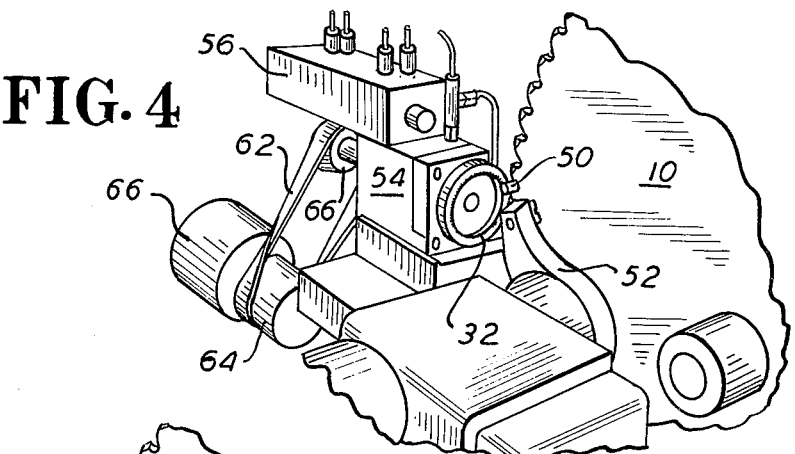
FIG. 4 illustrates the grinding wheel in its withdrawn position.
Figure 5:
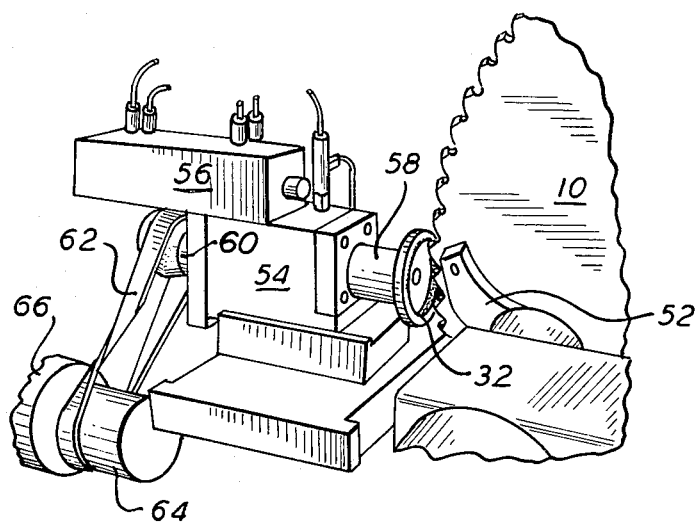
FIG. 5 illustrates the grinding wheel in its advanced position as it makes grinding contact with a tooth of the circular saw.

FIGS. 4 and 5 illustrate the manner in which the grinding wheel 32 is brought into contact with the saw blade teeth. FIG. 4 illustrates the grinding wheel 32 in its withdrawn position. In this attitude, an indexing finger 50 is free to advance another tooth into grinding position. In some embodiments it may be desirable to grind every tooth on the saw and in other embodiments, it may be desirable to grind alternate or irregular numbers of teeth. The technique of grinding alternate or irregular numbers of teeth is known to those of ordinary skill in the art. After the indexing finger 50 has advanced a tooth into position, a spring loaded hydraulic clamp mechanism 52 secures the saw blade 10 in an immobile fashion. At that point, the circular saw blade 10 is ready for grinding.

Grinding wheel 32 is shown in grinding contact with saw blade 10 according to the illustration of FIG. 5. The advancing and withdrawal of the grinding wheel 32 is controlled by hyraulic cylinder 54. The speed of the advance and withdrawal may be adjusted with hydraulic control means 56. Grinding wheel 32 is attached to rotatable shaft 58, the other end of which is connected to a crown pulley 60. A drive belt 62 connects crown pulley 60 to the output pulley 64 of a drive motor 66. During the course of the machine operation, the grinding wheel 32 is kept in a continually spinning state by the drive motor 66. As the shaft 58 advances and brings grinding wheel 32 into contact with saw blade 10, the drive belt 62 walks or travels across the face of the output drive pulley 64. In this manner, the grinding wheel 32 is continuously supplied with power from output drive motor 66. Clamp 52 may be open hydraulically but is spring loaded to provide tension and a certain amount of drag on the saw blade 10. A certain amount of drag is desirable during the indexing operation so that saw blade 10 does not continue to rotate after a tooth has advanced.

Figure 6:
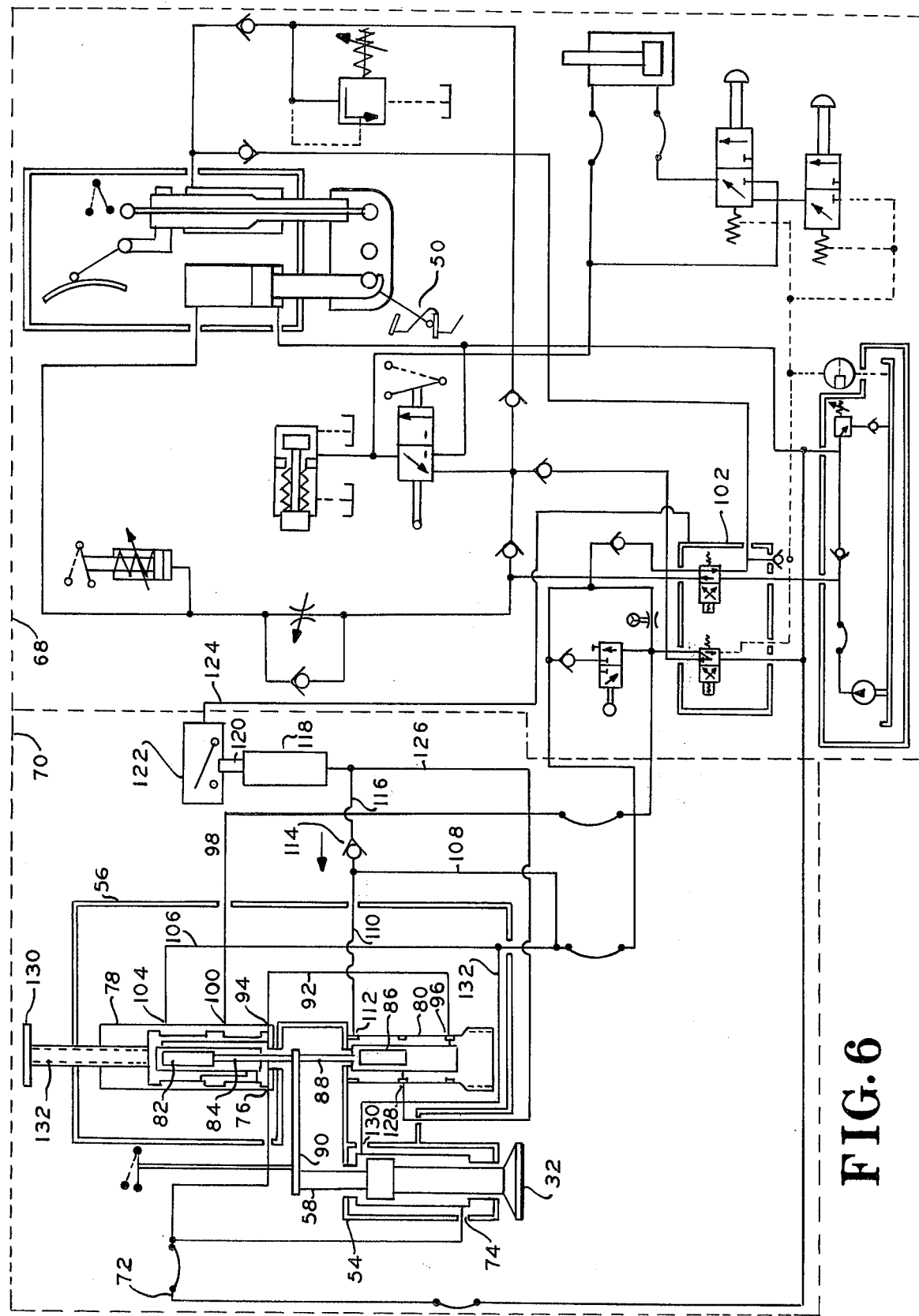
FIG. 6 is a schematic representation of the hydraulic piston and valve system of the present invention.

The electro-hydraulic system used to perform the functions illustrated in FIGS. 4 and 5 is shown in schematic detail in FIG. 6. In order to avoid unnecessary cost, it has been found practical to modify existing saw grinding machinery to perform the desired results. Therefore, according to the preferred embodiment, a Vollmer FINI-DUO B-1720TS was modified to perform the grinding function. The FINI-DUO B-1720TS ordinarily carries a pair of grinding wheels having abrasive on their outer as opposed to their inner rims. The tandem turning wheels are used to grind the sides of the teeth to a particular desired kerf for clearance. In this manner, the unmodified machine does not come in contact with the face of the tooth. However, as modified, the machine may be used to produce the desired continuous curved contour on the face of a carbide tipped saw tooth. The unmodified FINI-DUO B-1720TS already includes an indexing mechanism, a saw clamp and an electro-hydraulic system. For that reason, the details of these mechanisms will not be described in detail.

The electro-hydraulic system of FIG. 6 is divided into unmodified section 68 and modified section 70. The unmodified section 68 corresponds to that portion of the FINI-DUO B-1720TS which is commercially available and which is known to those of ordinary skill in the circular saw grinding art. On the other hand, the modified section 70 of the electro-hydraulic system contains several changes not found in the electro-hydraulic system of the FINI-DUO B-1720TS. In order to achieve the modification, the second grinding wheel piston of the FINIDUO is removed.

According to FIG. 6, an hydraulic supply line 72 supplies pressurized hydraulic fluid to port 74 of grinding wheel cylinder 54 and to port 76 within control means 56. Control means 56 includes a pair of cylinders 78 and 80. Cylinder 78 includes a spool 82 and a rod 84. Likewise, cylinder 80 includes a spool 86 and a rod 88. Rods 84 and 88 impinge upon lever 90 which, in turn, is connected to shaft 58. Rods 84 and 88 are not connected directly to 90 but rather maintain contact due to the hydraulic pressure in cylinders 78 and 80 respectively. The balance in the pressure between cylinders 78 and 80 is controlled by line 92 which connects port 94 of cylinder 78 with port 96 of cylinder 80. Line 92 serves the purpose of feeding hydraulic fluid from one cylinder to the other. Therefore, when one cylinder advances the other one automatically withdraws and vice-versa. A fluid output line 98 connects port 100 of cylinder 78 with an electronically controlled hydraulic solenoid valve means 102. Likewise, port 104 of cylinder 78 is connected via line 106 to the same valve means 102. Line 106 is also connected via line 108 to line 110 which connects port 112 of cylinder 80 with check valve 114. Check valve 114 is connected, in turn, via line 116 to dwell time delay cylinder 118. Check valve 114 only allows fluid to flow from line 116 into line 110 but not in the other direction. Dwell cylinder 118 includes a piston rod 120 which, when extended, impinges upon the contacts of limit switch 122. Limit switch 122 is electronically connected via line 124 to the solenoid control valve means 102. Line 116 and dwell cylinder 118 are also connected via line 126 to port 128 of cylinder 83. A knob 130 is connected onto shaft 132 which extends into cylinder 78. By adjusting knob 132, it is possible to manipulate the position of a sleeve within the casing of cylinder 78 which in turn controls the advance and withdrawal speeds of the grinding wheel 32.

In operation, a programmed electronic unit of the sort known to those of ordinary skill in the art will control the sequencing of such items as the indexing finger, the clamp and the whole transport mechanism which brings the grinding wheel 32 into contact with the saw blade 10. As indicated before, the speed of advance and withdrawal of the grinding wheel is controlled by adjusting knob 130. At the beginning of operation, line 72 is pressurized with hydraulic fluid which enters port 74 of cylinder 54 and port 76 of cylinder 78. During the advancing and withdrawal stage, the control means 56 generally acts as a booster to provide extra power via connecting rod 90 to the shaft 58. In this manner, cylinders 78 and 80 boost the power provided to shaft 58 by cylinder 54 via the direct connecting link 90. Typically, it is desirable to have a rapid advance and quick withdrawal of the grinding wheel but a relatively slow grinding portion of the cycle. As the spool 82 advances, it cuts off its feed supply port and ceases to boost the further advance of grinding wheel 32. Therefore, during the rapid portion of the advance of wheel 32, it is assisted by cylinders 78 and 80, but after the rapid advance portion is finished, the slow grinding portion is controlled by the cylinder 54 alone. When the grinding wheel 32 has ceased grinding, the hydraulic oil in cylinder 54 begins to back up through port 130 and line 132 into line 108 and from there into port 112 of cylinder 180 via line 110. Hydraulic fluid then flows across spool 86 and out of port 128 into line 126 and from there into dwell time cylinder 118. Continued hydraulic pressure causes the overflow to force piston rod 120 against limit switch 122. This breaks contacts within the limit switch and causes the spring loaded solenoid valves in control means 102 to bleed the entire system. This, in turn, initiates the withdrawal of the grinding wheel 32 from the vicinity of the saw blade 10 and back to its starting position as shown in FIG. 4.

Figure 7A:
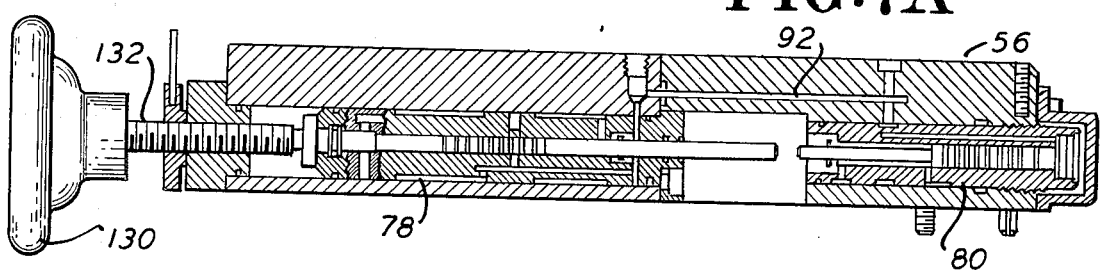
FIGS. 7A and 7B illustrate cross-sectional and top views, respectively, of the hydraulic cycle control means.
Figure 7B:
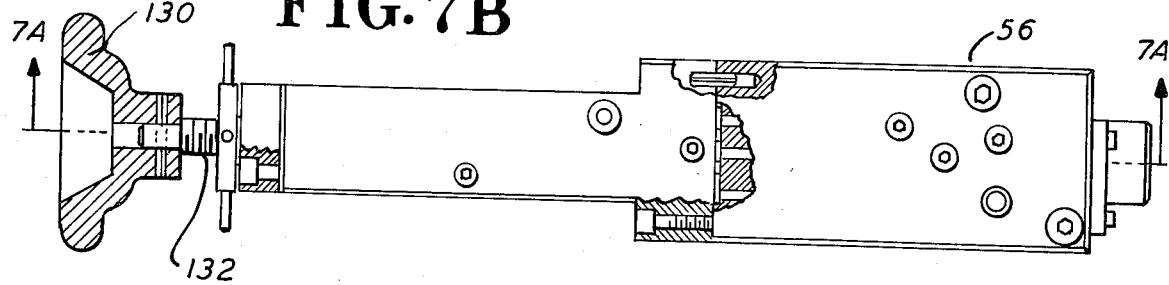

A detailed view of the control means 63 may be seen in FIGS. 7A and 7B. FIG. 7A is a cross-sectional view of the control means 56 of FIG. 7B as seen from prospective 7A-7A. The internal sleeve mechanism which controls the speed of the advance and withdrawal of grinding wheel 32 is housed in the interior of cylinder 78 and connected with shaft 132.

While the present invention has been described with reference to a particular embodiment, it will be understood by those of ordinary skill in the art that modifications are possible which remain within the spirit of the invention. For example, it would be possible to provide the grinding wheel with a rounded or otherwise non-flat grinding surface. This would, in turn, result in a non-conical contour on the finished saw tooth. Alternatively, it may be possible to alter the angle of approach in order to achieve the same conical surface by using a grinding wheel with a different angular relationship between the grinding surface and the axis of rotation. Moreover, it is possible to generate parabolic or compound continuous curves across the face of a tooth by using additional cylinders or other means to change the position of the grinding wheel 32 and/or the saw blade 10 during the grinding step.

With regard to the modified grinding equipment, there are other commercially available units which may be modified to achieve the same result. However, the FINI-DUO B-1720TS is especially adaptable to this new purpose, since it comes equipped with an hydraulic cylinder which travels in a direction perpendicular to a tangent on the outside circumference of the grinding wheel. Obviously, it would be possible to build such a machine from scratch, however the expenses involved make this approach generally uneconomical.

Similarly, the invention has been described in terms of a programmed electronic unit and an hydraulic system. Other types of control systems such as stepping switches, punched tape and the like, could be used also. The example of a programmed electronic unit and an hydraulic system were chosen because such equipment is available on modern machines, such as the FINI-DUO B-1720TS.

While the invention has been particularly shown and described with reference to a preferred embodiment thereof, it should be understood by those skilled in the art that various changes in form and detail may be made therein without departing from the spirit and scope of the invention.

What is claimed is:

1. An apparatus for automatically grinding the teeth of a circular saw to an improved contour, the apparatus comprising:
    a means for holding said circular saw;
    a grinding means for grinding a portion of the face of a tooth of a circular saw to a continuous curved contour having a more negative rake angle than the remaining portion of the face of said tooth, said grinding means comprising a cup-shaped grinding wheel having an inner abrasive rim;
    a transport means for bringing said inner abrasive rim and said face of said tooth into grinding contact; and,
    a sequencing means for controlling the automatic relative movements of the moving elements of said apparatus.

2. The apparatus of claim 1 wherein said inner abrasive rim includes diamond grit as a grinding compound.

3. The apparatus of claim 2 wherein said grit is held in a hard plastic medium.

4. The apparatus of claim 1 further including an indexing means for advancing a new tooth into position between the grinding operations of said cup-shaped wheel.

5. The apparatus of claim 4 wherein said transport means includes a control means for separately regulating the grinding and non-grinding time period of said grinding cup-shaped wheel.

6. The apparatus of claim 5 wherein said control means includes a delay means for signaling the end of the grinding period and for returning said wheel to a withdrawn position.

7. The apparatus of claim 6 wherein said sequencing means includes a programmed electronic unit and an hydraulic system, wherein said programmed electronic unit controls the operation of said hydraulic system which in turn controls the movement of said transport means and said indexing means.

8. The apparatus of claim 7 wherein said delay means comprises an hydraulic piston and a limit switch combination, wherein said piston receives overflow hydraulic fluid from said transport means after said grinding operation has finished.

9. The apparatus of claim 8 wherein said grinding wheel is connected to an hydraulic piston.

10. The apparatus of claim 9 wherein said indexing means includes an indexing finger attached to an hydraulic piston.

11. The apparatus of claim 1 wherein said cup-shaped wheel is adapted for rotation about an axis.

12. The apparatus of claim 11 wherein said apparatus includes a rotation means and a rotatable shaft connected thereto and further wherein said cup-shaped wheel is adapted for attachment to said shaft, the major axis of said shaft coinciding in a direction parallel to the axis of rotation of said cup-shaped wheel.

13. The apparatus of claim 11 wherein the rotation of said cup-shaped wheel generates a surface whose plane subtends an angle of between 0 and 30° with respect to said axis of rotation.

14. The apparatus of claim 13 wherein said cup has an inside diameter of approximately 1 to 10″ between the inner rim.

15. The apparatus of claim 1 wherein the tooth contour generated by said cup-shaped wheel is a conical surface.

16. The apparatus of claim 1 wherein the tooth contour generated by said cup-shaped wheel is parabolic in shape.

17. The apparatus of claim 1 wherein the tooth contour generated by said cup-shaped wheel is a continuous compound curve.

18. The apparatus of claim 1 wherein the more negative average rake angle of the continuous curved contour is a negative rake angle of between 0° and 30°.

19. A method for automatically grinding the teeth of a circular saw to an improved contour, the method comprising the steps of:
    securing said circular saw in a relatively immobile fashion;
    advancing the inner abrasive rim of a cup-shaped grinding wheel into grinding contact with one tooth of said circular saw;
    grinding a portion of the face of said tooth to a continuous curved contour having a more negative average rake angle than the remaining portion of the face of said tooth; and,
    withdrawing the grinding cup-shaped wheel from the vicinity of said tooth.

20. The method of claim 19 further including the step of:
    indexing a new tooth into grinding position after said withdrawing step.

* * * * *